United States Patent Office 2,940,877
Patented June 14, 1960

2,940,877

PAINT STRIPPING COMPOSITION

Lawrence L. Jaffe and Wendell L. Harris, Dayton, Ohio, assignors to General Motors Corporation, Detroit, Mich., a corporation of Delaware No Drawing. Filed Apr. 21, 1955, Ser. No. 503,012

8 Claims. (Cl. 134—38)

This invention relates to compositions for removing paints and the like from articles which have been coated with such materials.

Various compositions have, in the past, been developed which are effective, to various degrees, in removing paints, lacquers, varnish, enamels, japans and the like from surfaces which have been coated therewith. However, these compositions are generally ineffective in removing many coating materials containing synthetic resins, particularly those containing epoxy resins which are currently in wide use.

It is an object of this invention to provide an improved composition for completely removing, in a relatively short period of time, paints, varnishes, and the like and particularly those containing epoxy resins from surfaces which have been coated therewith.

It is a further object of this invention to provide a composition for removing varnishes, enamels, and the like and particularly those containing epoxy resins from metal surfaces coated therewith which comprises an aqueous solution of an alkali metal hydroxide, a monohydroxy benzene and suitable derivatives thereof and at least one compound selected from a class consisting of a monosaccharide, an organic acid derivative of a monosaccharide, an alkali metal salt of an organic acid derived from a monosaccharide, and a disaccharide.

It is well known that an aqueous solution of a caustic such as sodium hydroxide and phenol is effective in removing various paints from metal surfaces. However, these solutions are ineffective in removing coatings containing certain resins, particularly those containing epoxy resins. This invention lies primarily in the discovery that a monosaccharide such as glucose, an organic acid derivative of a monosaccharide such as gluconic acid, an alkali metal salt of an organic acid derived from a monosaccharide such as sodium gluconate or a disaccharide, may be added in certain specific proportions to an aqueous solution containing an alkali metal hydroxide and monohydroxy benzene in certain definite proportions to result in a composition which is effective in removing paints, varnishes, lacquers, enamels and the like, particularly those containing epoxy resins from metal surfaces. The removal is readily effected in a matter of a few minutes by immersing the part from which the paint or the like is to be removed in a bath containing the above mentioned constituents maintained at a temperature approaching its boiling point.

The various agents which may be successfully used for the purpose of the present invention include a variety of compounds. Any suitable caustic may be employed but the preferred compounds are sodium and potassium hydroxide, and particularly caustic soda because of its relatively low cost. The phenol may be any of the monohydroxy benzene compounds as, for example, phenol, cresol or xylenol, etc. The monosaccharide referred to may be any of the readily available sugars such as glucose. The organic acid derivatives of monosaccharides which are included within the scope of the invention are, for example, products obtained from the oxidation of glucose, namely, gluconic and sacchric acids and alkali metal salts of these acids such as potassium and sodium gluconate. The term disaccharides includes compounds such as sucrose, maltose and lactose but sucrose is preferred because of its relatively low cost.

A further understanding of the present invention will be obtained from the following examples which were carried out by immersing a metal plate coated with various paints containing an epoxy resin in an aqueous bath of the composition indicated mixed at room temperatures and maintained at temperatures of approximately 240° F.

Example 1

| | Pounds per gallon of water |
|---|---|
| Sodium hydroxide | 3 |
| Cresol | .6 |
| Cane sugar | .6 |

The paint was removed in 5 to 10 minutes and a final cold water rinse removed all traces of paint.

Example 2

| | Pounds per gallon of water |
|---|---|
| Sodium hydroxide | 4 |
| Phenol | .6 |
| Corn sirup | .6 |

The paint was removed in 5 to 10 minutes and the final cold water rinse removed all traces of the paint.

Example 3

| | Pounds per gallon of water |
|---|---|
| Sodium hydroxide | 3 |
| Phenol | .6 |
| Sodium gluconate | .6 |

The paint was removed in from 5 to 10 minutes and a cold water rinse removed all traces of the paint; however, the bath became thick and relatively difficult to use.

Example 4

| | Pounds per gallon of water |
|---|---|
| Sodium hydroxide | 3 |
| Cresol | .6 |
| Potassium gluconate | .03 |

The paint was removed in 5 to 10 minutes and a final cold water rinse removed all traces of the paint.

Example 5

| | Pounds per gallon of water |
|---|---|
| Sodium hydroxide | 3 |
| Cresol | .3 |
| Sodium gluconate | .03 |

The paint was removed in 5 to 10 minutes.

Example 6

| | Pounds per gallon of water |
|---|---|
| Sodium hydroxide | 3 |
| Cresol | .45 |
| Sodium gluconate | .03 |

The paint was removed in 5 to 10 minutes and a final cold water rinse removed all traces of the paint.

Example 7

| | Pounds per gallon of water |
|---|---|
| Sodium hydroxide | 3 |
| Cresol | .15 |
| Cane sugar | .6 |
| Sodium gluconate | .03 |

The paint was removed in 5 minutes and the final cold water rinse removed all traces of paint.

Example 8

| | Pounds per gallon of water |
|---|---|
| Sodium hydroxide | 3 |
| Cresol | .3 |
| Sodium gluconate | .03 |
| Cane sugar | .6 |

The paint was completely removed in three minutes and the cold water rinse removed all traces of the paint.

Example 9

| | Pounds per gallon of water |
|---|---|
| Sodium hydroxide | 3 |
| Cresol | .45 |
| Sodium gluconate | .03 |
| Cane sugar | .6 |

The paint was removed in three minutes and a final cold water spray removed all traces of the paint.

Example 10

| | Pounds per gallon of water |
|---|---|
| Sodium hydroxide | 2 |
| Sodium chloride | 1 |
| Cresol | .45 |
| Sugar | .6 |
| Sodium gluconate | .03 |

The paint wa removed in 5 and 10 minutes and a final cold water rinse removed the last traces of paint.

Example 11

| | Pounds per gallon of water |
|---|---|
| Sodium hydroxide | 6 |
| Cresol | .9 |
| Cane sugar | 1.2 |
| Sodium gluconate | .06 |

The paint was completely removed in 2 minutes at a temperature of about 280° F. and a cold water rinse removed all traces of paints. The boiling point of the solution was not reached due to the foaming action of the solution.

It is essential that the paint stripping composition includes both a monohydroxy benzene and a saccharide or suitable derivative thereof in addition to an alkali metal hydroxide to effectively strip epoxy resins containing coatings. The alkali metal hydroxide is preferably used in amounts of 1.5 to 6 pounds per gallon of water in the case of sodium hydroxide. Solutions having amounts of caustic soda below 1.5 pounds are generally too slow in stripping epoxy resin paints within a time useful in commercial operations whereas solutions containing caustic soda in excess of 6 pounds are generally subject to excessive foaming at temperatures in the vicinity of the boiling point. Other alkali metal hydroxides may be used in chemically equivalent amounts. The preferred monohydroxy benzene is cresol present in amounts of from .05 to 2.0 pounds per gallon of water. Phenol and xylenol may also be used in chemically equivalent amounts. The saccharide or suitable derivative thereof may be a disaccharide or a monosaccharide, an organic acid derivative of a monosaccharide or an alkali metal salt of an organic acid derived from a monosaccharide either singly or in combination. In a preferred solution containing a caustic alkali and a monohydroxy benzene in the ranges indicated above, gluconic acid or sodium gluconate may be present in amounts of from about .01 to .6 pound per gallon of water. Sucrose or glucose may be present from about .2 to 1.2 pounds per gallon of water. Excellent results are obtained in using gluconic acid or sodium gluconate in amounts of up to .6 pound per gallon of water together with sucrose or glucose in amounts from about .4 to .9 pound per gallon of water.

Best results are achieved when the stripping baths are operated substantially at their boiling points, that is, in the neighborhood of about 240° F. It has been found that in the above compositions the caustic alkali may be replaced by sodium chloride up to ½ of the weight specified for the sodium hydroxide to achieve stripping of epoxy resins paints in a reasonable time. It is believed that the sodium chloride functions to maintain the boiling point of the composition within a range where stripping is readily effected.

In general, within the ranges set forth above, the effectiveness of the solutions are increased with greater proportions of caustic alkali. With larger proportions of monohydroxy benzene, smaller proportions of saccharide or saccharide derivatives are needed for optimum results.

In use, as indicated above, the stripping solutions are preferably maintained substantially at their boiling points and the parts to be stripped of paint are merely immersed in the solution for a time sufficient to remove the paint after which the parts are removed from the bath and are sprayed with water to remove final traces of the paint and residual stripping solution. The bath may be regenerated by maintaining the alkalinity of the bath at a desired concentration and periodically adding the caustic alkali together with the other constituents in the solution in proportional quantities according to the particular formula used, as may be necessary to maintain the caustic alkali at about the original concentration. The amount of alkali to be added may be determined by well known methods. In the course of the paint stripping operations, the paint settles to the bottom of the tank containing the stripping solution and periodically the liquor may be decanted and the sludge removed.

Preferred compositions are shown in Examples 1, 6, 9 and 10. However, it should be understood that satisfactory results may be obtained within the ranges indicated above and optimum compositions are dependent on the choice of materials used in the stripping compositions, the type of paint to be stripped and desired operating conditions.

While the embodiments of the present invention as herein disclosed, constitute preferred forms, it is to be understood that other forms might be adopted.

What is claimed is as follows:

1. A paint stripping composition comprising originally water, about 0.01 to 0.06 pound of sodium gluconate per gallon of water, an alkali metal hydroxide taken from the group consisting of sodium hydroxide and potassium hydroxide molecularly equivalent to from about 3 to 6 pounds of sodium hydroxide per gallon of water and a monohydroxy benzene taken from the group consisting of phenol, cresol and xylenol molecularly equivalent to about 0.3 to 0.9 pound of cresol per gallon of water.

2. A paint stripping composition comprising originally water, about 0.01 to 0.06 pound of gluconic acid per gallon of water, an alkali metal hydroxide taken from the group consisting of sodium hydroxide and potassium hydroxide molecularly equivalent to from about 3 to 6 pounds of sodium hydroxide per gallon of water and a monohydroxy benzene taken from the group consisting of phenol, cresol and xylenol of a molecular equivalent of about 0.3 to 0.9 pound of cresol per gallon of water.

3. A paint stripping composition comprising originally water, about 0.6 to 1.2 pounds of glucose per gallon of water, an alkali metal hydroxide taken from the class consisting of potassium hydroxide and sodium hydroxide molecularly equivalent to about 3 to 6 pounds sodium hydroxide per gallon of water and a monohydroxy benzene taken from the class consisting of phenol, cresol and xylenol molecularly equivalent to about 0.3 to 0.9 pound of cresol per gallon of water.

4. A paint stripping composition comprising originally water, about 0.4 to 0.9 pound of a disaccharide per gallon of water, an alkali metal hydroxide taken from the group consisting of sodium hydroxide and potassium hydroxide molecularly equivalent to 3 to 6 pounds of sodium hydroxide per gallon of water and a monohydroxy benzene taken from the group consisting of phenol, cresol and xylenol molecularly equivalent to about 0.3 to 0.9 pound of cresol per gallon of water.

5. A paint stripping composition comprising originally water, about 0.4 to 0.9 pound of sucrose per gallon of water, an alkali metal hydroxide taken from the group consisting of sodium hydroxide and potassium hydroxide molecularly equivalent to 3 to 6 pounds of sodium hydroxide per gallon of water and a monohydroxy benzene taken from the group consisting of phenol, cresol and xylenol molecularly equivalent to about 0.3 to 0.9 pound of cresol per gallon of water.

6. A paint stripping composition comprising originally water, about 3 pounds of sodium hydroxide per gallon of water, about 0.3 to 0.5 pound of cresol per gallon of water, and about 0.03 pound of sodium gluconate per gallon of water.

7. A paint stripping composition comprising originally an alkali metal hydroxide taken from the class consisting of sodium hydroxide and potassium hydroxide, a monohydroxy benzene taken from the class consisting of phenol, cresol and xylenol and at least one compound taken from the class consisting of glucose, gluconic acid, saccharic acid, sodium gluconate, potassium gluconate, sodium saccharate, potassium saccharate, and a disaccharide, said alkali metal hydroxide being present in amounts molecularly equivalent to from 3 to 6 pounds of sodium hydroxide per gallon of water, said monohydroxy benzene being present in amounts molecularly equivalent to about 0.3 to 0.6 pound per gallon of water, said gluconic acid, saccharic acid, sodium gluconate, potassium gluconate, sodium saccharate and potassium saccharate being present in amounts molecularly equivalent to about 0.03 to 0.6 pound of sodium gluconate per gallon of water and said glucose and disaccharide being presented in amounts molecularly equivalent to about 0.6 to 1.2 pounds per gallon of water.

8. In a method for removing a coating of paint, varnish and the like from an article coated therewith, the steps comprising of heating a solution in accordance with claim 7 to approximately its boiling point and subjecting the article to said solution for a time sufficient to remove said coating.

References Cited in the file of this patent
UNITED STATES PATENTS

| | | |
|---|---|---|
| 982,524 | Patty | Jan. 24, 1911 |
| 1,322,009 | Gorius | Nov. 18, 1919 |
| 1,744,463 | Gravell | Jan. 21, 1930 |
| 2,584,017 | Dvorkovitz et al. | Jan. 29, 1952 |
| 2,650,875 | Dvorkovitz et al. | Sept. 1, 1953 |
| 2,653,860 | Meyer | Sept. 29, 1953 |

FOREIGN PATENTS

| | | |
|---|---|---|
| 259,360 | Germany | Apr. 23, 1913 |
| 780,292 | France | Jan. 29, 1935 |

OTHER REFERENCES

Surface Active Agents, by Schwartz et al. (1949), page 465, pub. by Interscience Pub. Inc., New York.

Condensed Chemical Dictionary, 4th Ed. (1950), pages 214 and 319, pub. by Reinhold Pub. Corp., New York.